United States Patent [19]

Vann

[11] Patent Number: 5,241,557
[45] Date of Patent: Aug. 31, 1993

[54] LASER FOCUS COMPENSATING SENSING AND IMAGING DEVICE

[75] Inventor: Charles S. Vann, Fremont, Calif.

[73] Assignee: The United States of America as represented by the United States Department of Energy, Washington, D.C.

[21] Appl. No.: 848,583

[22] Filed: Mar. 9, 1992

[51] Int. Cl.$^5$ .............................................. H01S 3/08
[52] U.S. Cl. ..................................... 372/101; 372/108
[58] Field of Search ........................... 372/99, 101, 108

[56] References Cited

U.S. PATENT DOCUMENTS

| | | |
|---|---|---|
| 3,603,688 | 9/1971 | Smith-Vaniz . |
| 3,619,069 | 11/1971 | Alexander . |
| 3,849,742 | 11/1974 | Hughes et al. ........................ 372/93 |
| 3,919,663 | 11/1975 | Caruolo et al. . |
| 3,942,127 | 3/1976 | Fluhr et al. ........................ 372/108 |
| 3,999,858 | 12/1976 | Hernquist et al. . |
| 4,498,180 | 2/1985 | Severinsson . |
| 4,633,479 | 12/1986 | Trageser . |
| 4,664,517 | 5/1987 | Guthrie et al. . |
| 4,873,692 | 10/1989 | Johnson et al. ..................... 372/100 |
| 4,917,490 | 4/1990 | Schaffer et al. . |

Primary Examiner—Leon Scott, Jr.
Attorney, Agent, or Firm—Henry P. Sartorio; Roger S. Gaither; William R. Moser

[57] ABSTRACT

A laser focus compensating sensing and imaging device permits the focus of a single focal point of different frequency laser beams emanating from the same source point. In particular it allows the focusing of laser beam originating from the same laser device but having differing intensities so that a low intensity beam will not convert to a higher frequency when passing through a conversion crystal associated with the laser generating device. The laser focus compensating sensing and imaging device uses a cassegrain system to fold the lower frequency, low intensity beam back upon itself so that it will focus at the same focal point as a high intensity beam. An angular tilt compensating lens is mounted about the secondary mirror of the cassegrain system to assist in alignment. In addition cameras or CCD's are mounted with the primary mirror to sense the focused image. A convex lens is positioned co-axial with the cassegrain system on the side of the primary mirror distal of the secondary for use in aligning a target with the laser beam. A first alternate embodiment includes a cassegrain system using a series of shutters and an internally mounted dichroic mirror. A second alternate embodiment uses two laser focus compensating sensing and imaging devices for aligning a moving tool with a work piece.

12 Claims, 5 Drawing Sheets

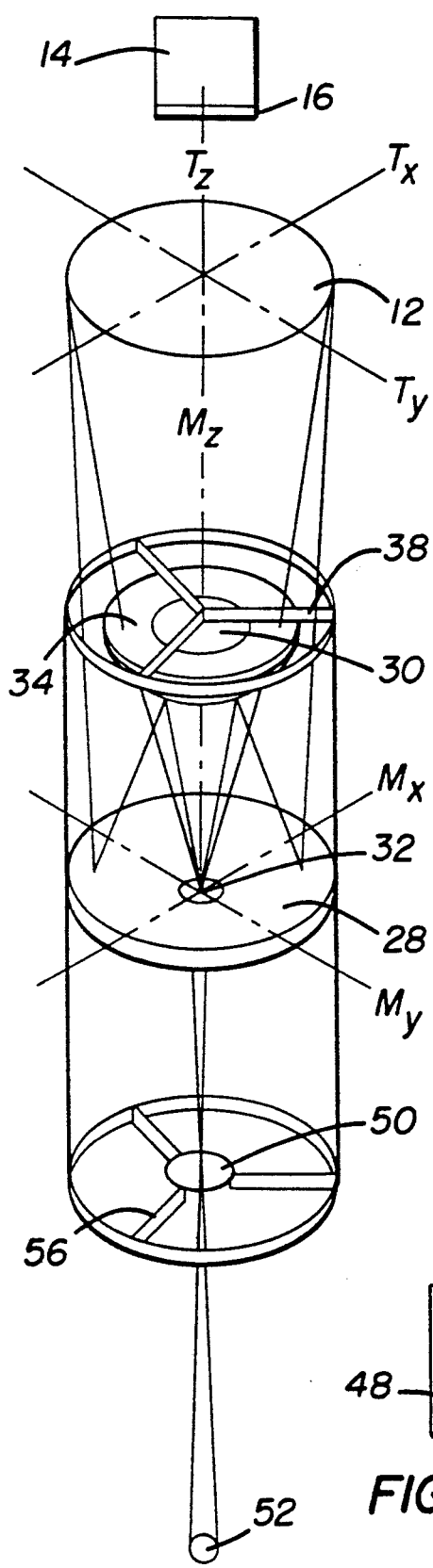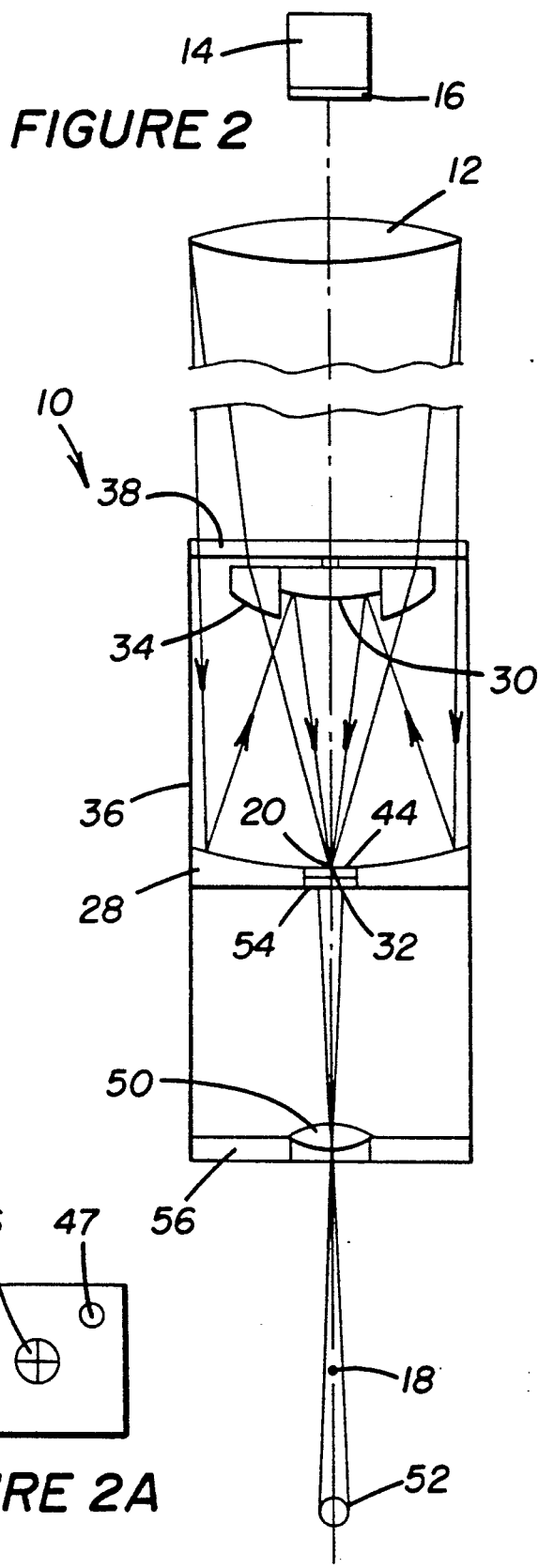
FIGURE 2
FIGURE 2A
FIGURE 3

LASER FOCUS COMPENSATING SENSING AND IMAGING DEVICE

The United States Government has rights to this invention pursuant to Contract No. W-7405-ENG-48 between the U.S. Department of Energy and the University of California for operation of Lawrence Livermore National Laboratory.

BACKGROUND OF THE INVENTION

This invention relates to the focusing of high energy laser beams. In particular, it relates to the alignment and focusing of high energy laser beams wherein the frequency of the laser is converted by passing through a conversion crystal before impacting on a target. The system utilizes a single low intensity laser beam which is not affected by the crystal, for the alignment and focusing.

Presently, most large multi-amplifier laser devices utilize two separate, low intensity laser beams to align the main laser: one to align the beam through the laser and the other to align the beam from the conversion crystals to the target. In utilizing this system it is necessary to align the two laser beams one with the other and then subsequently compare the alignment on the target to the resulting high energy beam. The reason two separate alignment lasers have been used rather than one, is because of lens dispersion of the different frequency light after the beam passes through the conversion crystal. In short, the main beams, because of their high energy are often converted to a higher frequency before hitting a target. This conversion occurs with a high intensity beam. Since the alignment laser beam is of low intensity, it does not convert as it is passed through the conversion crystal. After the high intensity beam is converted to a higher frequency, it passes through a lens which focuses the beam onto a target. Because of the dispersion characteristics of a lens, the focal point for the higher frequency beam will be closer to the lens than the low intensity beam which does not convert. For example, a laser beam of low intensity and of a particular frequency and a wave length of 1054 nm will be unaffected by the conversion crystal. If that same 1054 nm laser is raised to a high intensity, when it passes through the conversion crystal in the laser it exits the conversion crystal with the higher frequency and a wave length of 351 nm. The 351 nm laser beam, as noted above, will focus closer to the focusing lens than the low intensity beam of 1054 nm. To provide an alignment beam which focuses on the target as in the main beam, in the past, a second alignment laser beam was injected into the system which had the same frequency as the main beam after conversion, i.e., 351 nm wave length in our example. As also noted, this requires co-alignment of the two alignment laser beams, i.e., the co-alignment of the 1054 nm and 351 nm beams in our example.

If it were possible to use a single alignment beam for both laser and target alignment, then there would be no need for a second alignment laser nor the need to co-align the two separate alignment laser beams.

This invention describes a device that permits one to use a single and low intensity alignment laser for both laser and target alignment, wherein the device compensates the low intensity alignment laser beam to focus and point a the high intensity beam in spite of the frequency dispersion caused by the focusing lens.

A second function of the present invention is to align a target relative to the laser beams once the above beam alignments have been accomplished.

The second function is currently performed by indirect viewing devices that are located near the target's final position. These indirect viewing devices may also be inaccurate and costly.

It is a object of this invention to provide a low cost means for compensating, sensing and imaging laser beams to a very high focus and a very high pointing accuracy.

It is also an object of this invention to position a machine tool adjacent to a workpiece with a great degree of accuracy.

It is a further object of this invention to provide means to focus coaxial laser beams having different frequencies.

SUMMARY OF THE INVENTION

The device disclosed herein is a laser focus, compensating, sensing and imaging device for use with a variable intensity laser beam and a focusing lens. The device consists of a convex tilt measuring lens, a convex mirror and a concave mirror. The device is mounted so that the convex and the concave mirror form a cassegrain system with the convex tilt measuring lens mounted in the same plane as the convex mirror and coaxial therewith. The focusing lens is mounted distal of the concave mirror and exterior of the cassegrain system so that a low intensity and parallel ray coherent laser beam may be focused to the focal point on the concave mirror by using the focusing lens and the cassegrain system and such that a high intensity coherent and parallel ray laser beam emanating from the same source as the low intensity beam will be focused while using the same focusing lens at the same focal point as the low energy beam using the cassegrain system.

BRIEF DESCRIPTION OF THE DRAWINGS

FIG. 2 is a cross-sectional representation of the laser focus compensating and sensing device shown in relation to a laser focusing lens.

FIG. 2a is a representation of an image on a video display terminal.

FIG. 3 is a isometric view of the device shown in FIG. 2.

DETAILED DESCRIPTION OF THE PREFERRED EMBODIMENT

Referring now to FIG. 2, a cross-sectional view of the laser focus compensating sensing and imaging device is shown at 10. Also shown in FIG. 2 is a focusing lens 12 and a laser source 14. It is to be understood that laser source 14 is shown as are the other elements in this particular Figure in schematic form. Laser source 14 is a multi-amplifier device capable of producing both low intensity and high intensity laser beams. Incorporated in the laser device 14 is a conversion crystal 16 which serves to increase the frequency and conversely decrease the wave length of the emanating laser beam when used in the high energy mode.

Figure 4:
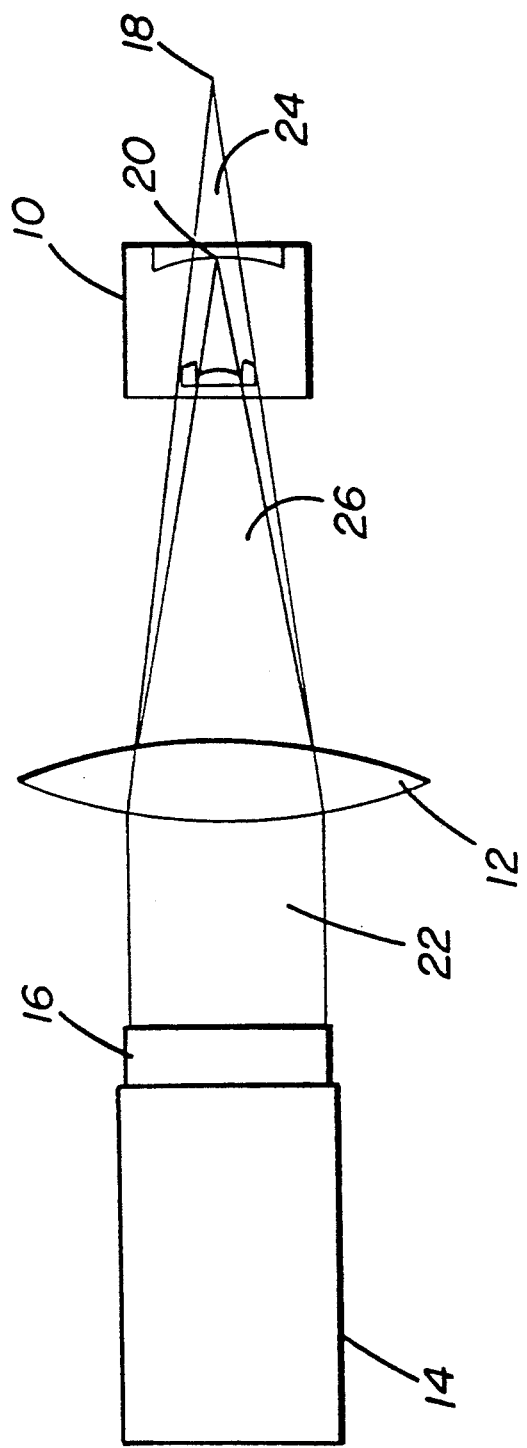
FIG. 4 is a schematic of the focal points of low and high frequency laser beams.

Referring to FIG. 4, the focusing lens 12 is shown relative to the laser source 14 and the conversion crystal 16. Assuming that the laser source 14 is capable of producing a laser output having a wave length of 1,054 nm, the conversion crystal 16 will have no effect on the frequency of the emanating laser light until that laser reaches a high intensity level. When the laser reaches the high intensity level, the conversion crystal 16 will change the frequency to a higher frequency with a wave length of 351 nm. With the change in frequency, the focal point 18 of the low intensity beam is moved closer to the focusing lens 12 to a point 20 (see also FIG. 2). This repositioning of the focal point is well-known in the optical art and will not be further described here but is attributable at least in part to the diffraction and refraction in the focusing lens 12.

When it becomes necessary to position and focus the beam 22 as shown figuratively in FIG. 4, it is necessary to use the lower intensity beam since the device could not survive in irradiation by the higher intensity beam.

It then becomes apparent that either a second alignment beam of the same higher frequency (not shown) must be utilized or some compensation made to locate the focal point of the low intensity, low frequency beam at the same point as the focal point of the high intensity, high frequency beam. This invention imposes the laser focus, compensation and sensing device 10 into the low frequency beam so that the focal point 18 is compensated to point 20. This compensation is achieved by folding the beam back upon itself using a cassegrain system such that the folded beam path of the low frequency beam 24 will focus at the same point 20 as the focal point of the high frequency beam 26.

Referring now to FIG. 2, a more detailed description of the laser focus compensating sensing and imaging device 10 will be undertaken. The device consists of a primary mirror 28 which is concave in shape and a secondary mirror 30 which is convex in shape, the two mirrors 28 and 30 form a conventional cassegrain system such that light impinging upon primary mirror 28 is reflected back to the secondary mirror 30 and then in turn reflected to the focal point of the cassegrain system. In this instance the focal point of the cassegrain system is located at the center point 32 of the primary mirror. Located at the focal point 32 is a "camera" in the form of a charged coupled device or CCD 44 so that the image can be observed on a remotely located cathode ray tube (schematically shown in FIG. 2a) in a manner well-known in the art. Surrounding the secondary mirror 30 is a convex annular tilt measuring lens 34 the purpose of which will become apparent in the ensuing discussion.

The cassegrain system is formed in the usual manner with a tube or other structural device 36 positioning the primary mirror 28 in the proper position relative to the secondary mirror 30. The secondary mirror 30 and the tilt measuring lens 34 can be mounted together by means of a spider 38 which can permit movement of the secondary mirror 30 and the tilt measuring lens 34 toward and away from the primary mirror 28 in order to properly focus this system before it is utilized in the laser alignment mode. This type of structure is familiar to optical workers in the telescopic field and will not be further described herein. Further, the optical properties of the primary mirror 28 and the secondary mirror 30 are conventional in nature and need not be discussed at greater length at this point.

Figure 1:
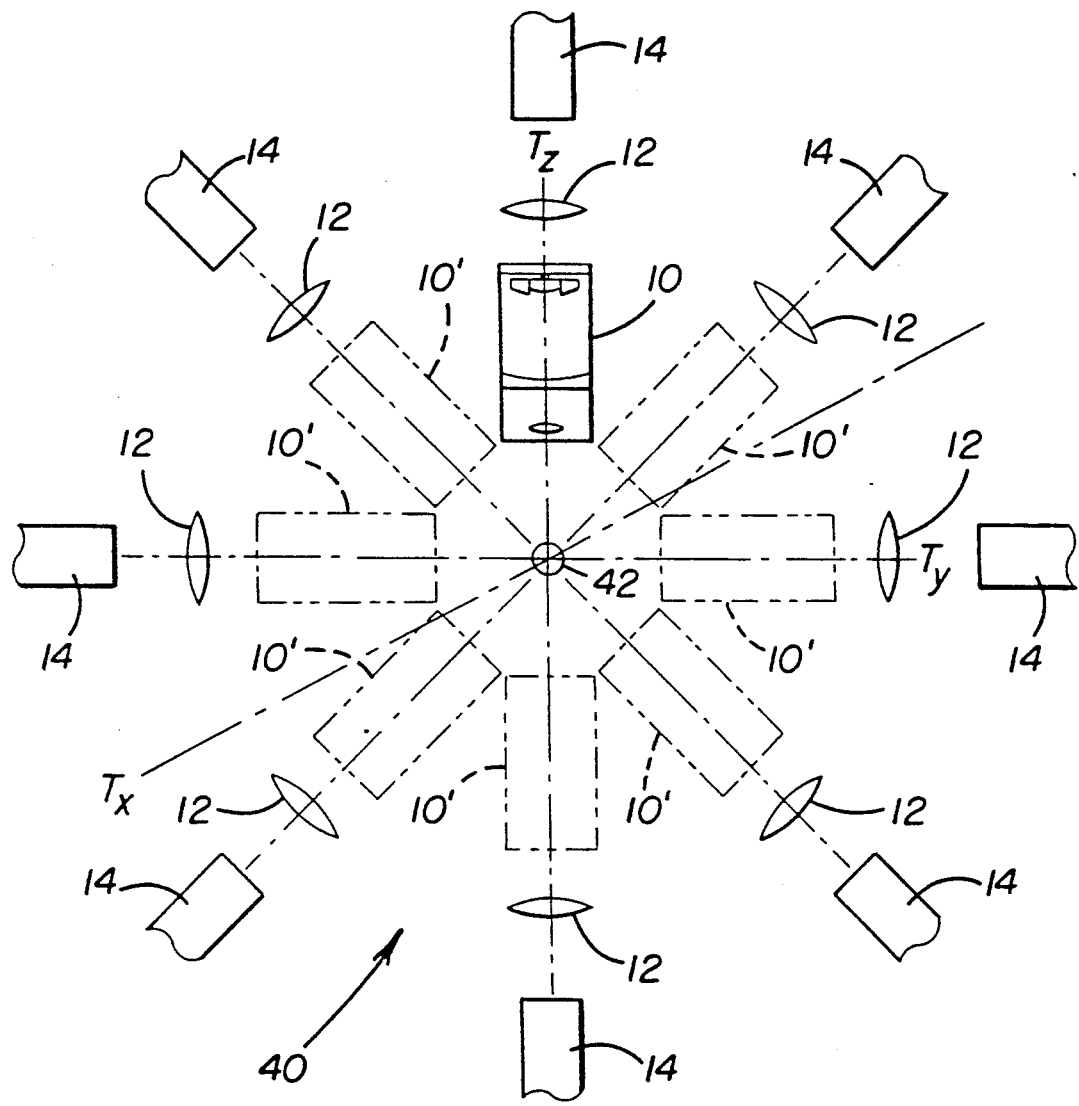
FIG. 1 is a schematic view of a system in which multiple laser beams are to be focused on a point at the center of a sphere wherein the laser focus compensating and sensing device is shown in position to align one of the plurality of laser beams.

Referring now to FIG. 1, the device is shown mounted in a multi-laser device 40. In device 40, eight lasers 14 are shown surrounding a target 42. In use, the number of lasers is such that a spherical arrangement may be necessary with the target 42 at the center of the sphere. It is the purpose of the eight or more lasers 14 to impinge upon the target 42 raising the temperature of target 42 to a substantially higher degree. In order to accomplish this, the laser beams emanating from the plurality of lasers 14 must be aligned and focused on the target 42. To accomplish this, a laser focus compensating, sensing and imaging device 10 can be positioned successively in the beam paths of the lasers between the focusing lenses 12 and the target 42. In FIG. 1, it is to be understood that only one laser focusing device is necessary; however, additional focusing devices 10' have been shown in the diagram to show where the focusing device 10 would be positioned successively in the apparatus 40.

In order to focus the laser beam 22 (see FIG. 4), a low intensity laser is produced in the laser 14 with the laser compensating and sensing device 10 positioned as shown in FIG. 1. Focusing lens 12 would, without the laser compensating device focus the low intensity beam at the point 18 shown in FIG. 2. However, with a high intensity beam and the concomitant conversion of the frequency in the conversion crystal 16, the focusing is at focal point 20. Thus, since the focal point 20 can be calculated as can the focal point 18, the laser compensating and focusing device is positioned so that a folded low intensity beam will focus at point 20. It can be seen that the incoming rays from the focusing lens 12 will impinge upon the primary mirror 28 to be reflected back upon themselves to the secondary mirror 30 and then focus at point 20.

With the device positioned as shown in FIG. 2, that is relative to the laser 14, the device is capable of sensing five degrees of freedom of the alignment laser beam with respect to the device. The device senses two degrees of tilt Mx and My (see FIG. 3) of the camera or CCD 44 relative to the incoming beam and three degrees of translation of the focusing lens 12 Tx, Ty and Tz. The only degree of freedom not sensed, the beam rotation about its own axis Mz, is not relevant to beam alignment.

The tilt measuring lens 34 is sensitive to tilt of the camera or CCD 44, but insensitive to translation of the focusing lens. The cassegrain system is also sensitive to tilt of the camera or CCD 44 but also sensitive to translation of the focusing lens. To discern the translation errors from tilt errors, the tilt errors are corrected first with the tilt measuring lens. Tilt errors are corrected by adjusting the tilt of the laser focus compensating sensing and imaging device 10. A tilt error in this particular instance is defined as a distance of the focus spot of the tilt measuring lens from the center of the camera 44. In FIG. 2a a representation of the display received by camera or CCD 44 is shown. In particular, the desired center point is represented by a cross hairs 46 while the focus spot of the tilt measuring lens 47 may be adjacent too but off center from the focus spot 46. When the focal spot 47 is at the center of the camera 44 it will be coincident with the cross hairs 46 on the associated display. This occurs only when the laser focus compensating sensing and imaging device is normal to the alignment beam i.e., properly tilted in Mx and My and the central ray with respect to the beam direction.

If the cassegrain focal spot represented by the spot 48 in FIG. 2a is still misaligned after the tilt correction (that is after spot 47 is located in the center of the cross hairs 46) then the error must be due to translation. It should be pointed out that it is a simple matter to delineate spots 47 and 48, the tilt measuring lens spot and the cassegrain spot respectively, by simply observing the spots while adjusting either the focusing lens or the cassegrain system. The focus spot of the cassegrain system is used to correct translation errors. The translation errors are corrected by moving the focusing lens 12 until the spot 48 of the cassegrain system is at the center of the camera 46. This corrects for the focus lens translation errors parallel to the laser focus compensating sensing and imaging device camera face Tx, Ty. The translation error normal to the camera face Tz is observed as an error in beam focus. If the distance from the focus lens to the laser focus compensating, sensing and imaging device is the focal length of the focal lens 12, the focus of the alignment beam onto the camera face 44 will be at best focus through both the tilt measuring lens 34 and the cassegrainian system. If this distance is not the focal length, the focal spot will be larger for both lenses. The distance of translation error related to the increase size of the focal spot can readily be calculated. The focus lens 12 is then translated to correct the Tz translation error.

Referring now to FIG. 2, an imaging lens 50 is mounted in an extension of tube 36 so that the image of a target 52 may be focused upon a second camera or CCD 54. Camera or CCD 54 is mounted on the face opposite the mirror surface of primary mirror 28. Imaging lens 50 may be mounted to the extension of tube 36 in the same manner as the secondary mirror 30 that is, by a spider 56.

If a CCD is utilized, the image would be projected by means of a computer onto a video display tube such as is represented in FIG. 2a.

In order to utilize the imaging portion of this device, the tube 36 is moved backwardly away from the focal spot determined in the alignment process noted above so that the target 52 will be located at the focal point of the high frequency beam 20.

Three reference lasers externally located from the target establish a reference coordinate system for the laser focusing compensating sensing and imaging device such that they are orthogonally positioned and oriented so that their beams cross at the desired location of the target (see FIG. 1). To reference the device to each axis of the target reference system, the device is aligned separately and sequentially to each reference beam. The device is tilted to be co-axial to the reference beam as described above and translated to center the focus of the reference beam onto the camera. The device is then moved to the next axis and centered in the same way. This procedure places the center of the device, i.e., the camera, at the same point as the desired location for the target. After beam alignment, the same three reference beams are used during target alignment to insure that the imaging system is observing the target along the target reference axis. (If the camera and imaging lens system are not on the axis, a false target position error will result.) It should be noted that in FIG. 1 the devices are represented as being in one plane. This is done for convenience only as the devices may be placed on the circumference of a sphere surrounding the desired target position 42.

THE FIRST ALTERNATE EMBODIMENT

Referring now to FIGS. 5, 6, 7 and 8, an alternate embodiment of the device is depicted which permits the alignment of laser beams having different frequencies. As previously mentioned, laser beams having different frequencies will be refracted with a different focal point after they are passed through a focusing lens. In this embodiment, differing frequency laser beams can be focused on the same sensing or sensor position by use of a dichroic mirror or lens in the cassegrainian system utilized in the principal embodiment.

Figure 5:
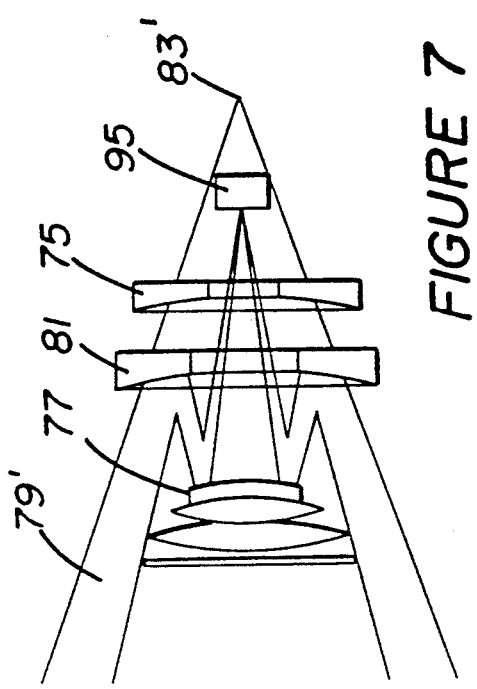
FIG. 5 is an alternative embodiment of the device shown in FIG. 2 using a dichroic mirror.

The structure is as follows. Reference should be made to FIG. 5. The cassegrainian system consists of a primary mirror 75 and a secondary mirror 77. Primary mirror 75 is concave as noted above while secondary mirror 77 is convex in the usual cassegrainian format. The secondary mirror 77 is of smaller diameter than the primary mirror 75 so that incoming light in the form of a beam 79 can impinge upon the primary mirror 75.

Disposed between the primary mirror 75 and secondary mirror 77 is a dichroic mirror 81. Dichroic mirror 81 permits or rather allows the transmission of a lower frequency laser while reflecting the light of a higher frequency laser. This is best shown by reference to FIG. 7 wherein the same dichroic mirror 81 is shown in the cassegrainian system consisting of concave mirror 75 and convex mirror 77 wherein the dichroic mirror 81 becomes the primary mirror by reflecting the incoming light from beam 79' which is of a higher frequency than that of the lower frequency beam 79. In this connection, it is pointed out that representations between FIGS. 5 and 7 indicate that focal points of 83 and 83' respectively, are differing distances from the cassegrainian system. This is because the lower frequency laser beam will converge farther away from the focusing lens than the higher frequency beam.

In addition to the cassegrainian system just described, there is a pair of convex lenses 85 and 87 that are mounted adjacent to secondary mirror 77 and distal of the primary mirror 75. Also, a shutter system 89 is included with the system depicted in FIGS. 5, 6, 7 and 8. Specifically, the shutter system 89 shown in FIG. 5 which blocks light passing through the lenses 85 and 87 can be replaced with a second shutter 89' so that the low frequency beam 79 is directed through both convex lenses 87 and 85, but blocks light passing into the cassegrainian system then through the coaxial hole 91 in the dichroic mirror 81 and the hole 93 in the primary mirror 75. It is to be understood that these holes are coaxial with and pierce the two mirrors. Located at the focal point is a sensor 95 which may be in the form of a camera or CCD. These two lenses together result in the higher frequency laser beam also converging on sensor 95.

Figure 8:
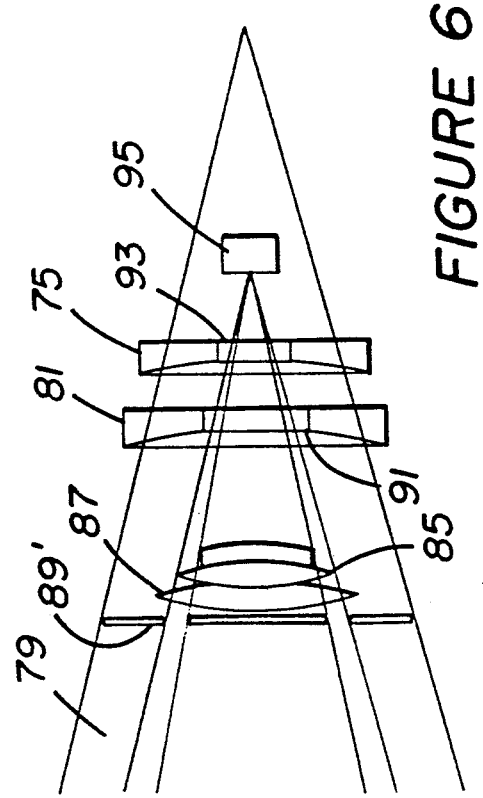
FIG. 8 is the same device shown in FIG. 5 wherein the higher frequency beam is passed through a shutter when both of the convex lenses mounted adjacent the secondary mirror in the cassegrain portion of the system.

Shutter 89 and 89' may in like manner be replaced by a third shutter 89" as shown in FIG. 8 that permits transmission of light through only convex lens 87 while blocking the cassegrainian system.

USE OF THE ALTERNATE EMBODIMENT

Figure 7:
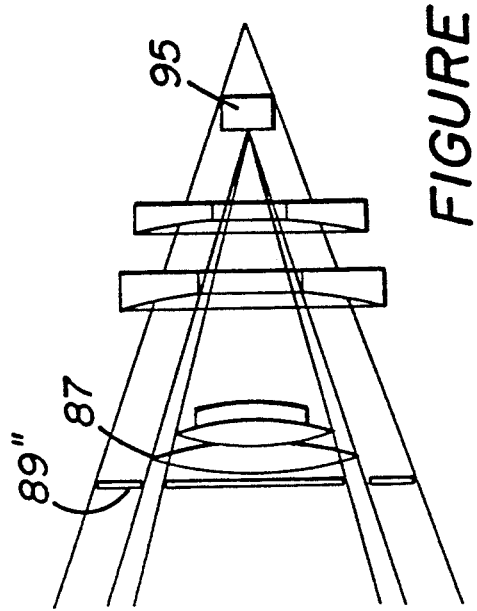
FIG. 7 is the same device shown in FIG. 5 with a higher frequency beam wherein the higher frequency beam is reflective off of a dichroic mirror.
Figure 6:
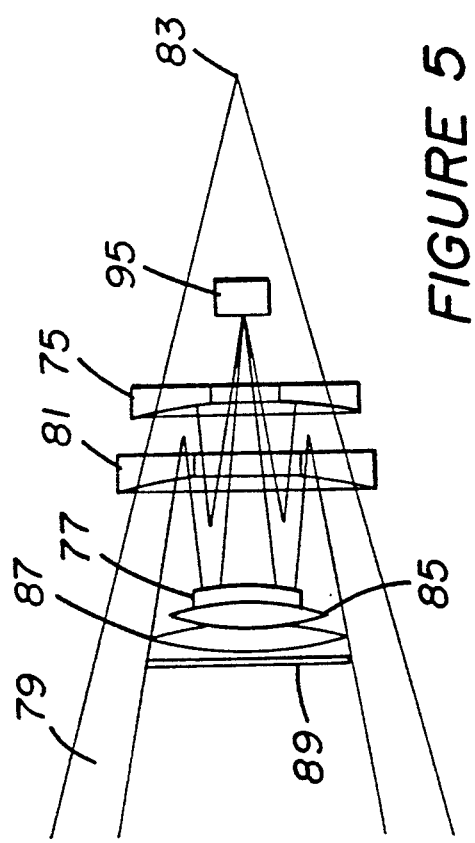
FIG. 6 is the same device shown in FIG. 5 utilizing the modified lens part.

FIGS. 5 and 6 represent usage of the alternate embodiment with a lower frequency laser beam such that the light of the laser beam passing through the dichroic mirror 81 and impinging upon the principal primary mirror 75 is reflected back to the secondary mirror and thence to the sensor 95. In like manner, the lower frequency beam is focused on the sensor 95 through the use of the shutter 89' and the lens 85 and 87. Once the lower frequency beam is positioned on the center of the sensor 95, then the higher frequency laser beam can be passed through the system so that it will reflect off the dichroic mirror 81 back to the secondary mirror 77 and thence through the holes 91 and 93 to the sensor 95. This is illustrated in FIG. 7. Just as was accomplished in the lower frequency situation, the shutter 89 is replaced with the shutter 89" so that the higher frequency beam passes through lens 87 to be focused on sensor 95 in the manner shown in FIG. 8.

Utilizing this system, two or more laser beams can be co-aligned. It is to be understood that the structure shown in FIGS. 5, 6, 7 and 8 would be contained in a conventional cassegrainian system with the sensor 95 mounted exterior of the cassegrainian system. The necessary supporting structure has not been shown because it would confuse the illustration. Since it is well-known in the art how to mount a cassegrainian system, it is not considered necessary to go into that detail in this specification.

THIRD EMBODIMENT

Figure 10A:
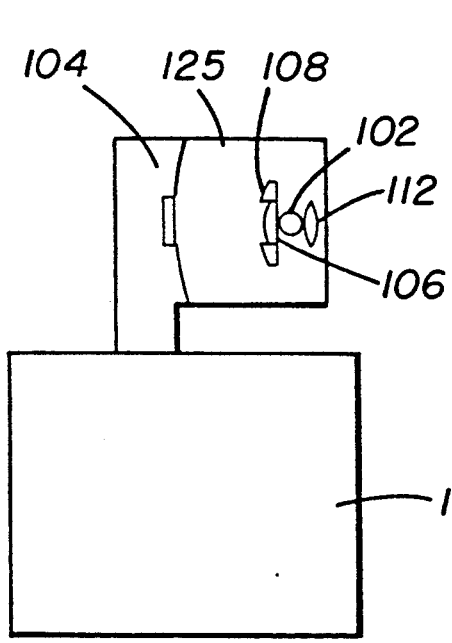
FIG. 10a is a schematic plan view of the device shown in FIG. 10.
Figure 10:
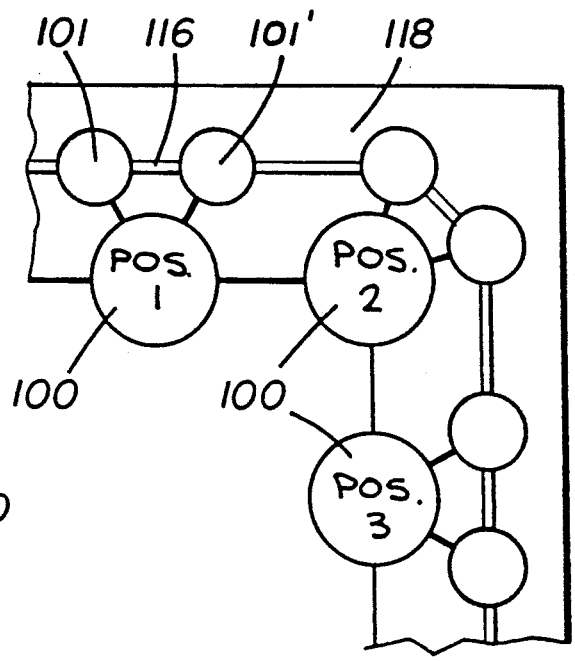
FIG. 10 represents the device shown in FIG. 9 in schematic form positioning a tool adjacent a workpiece.
Figure 9:
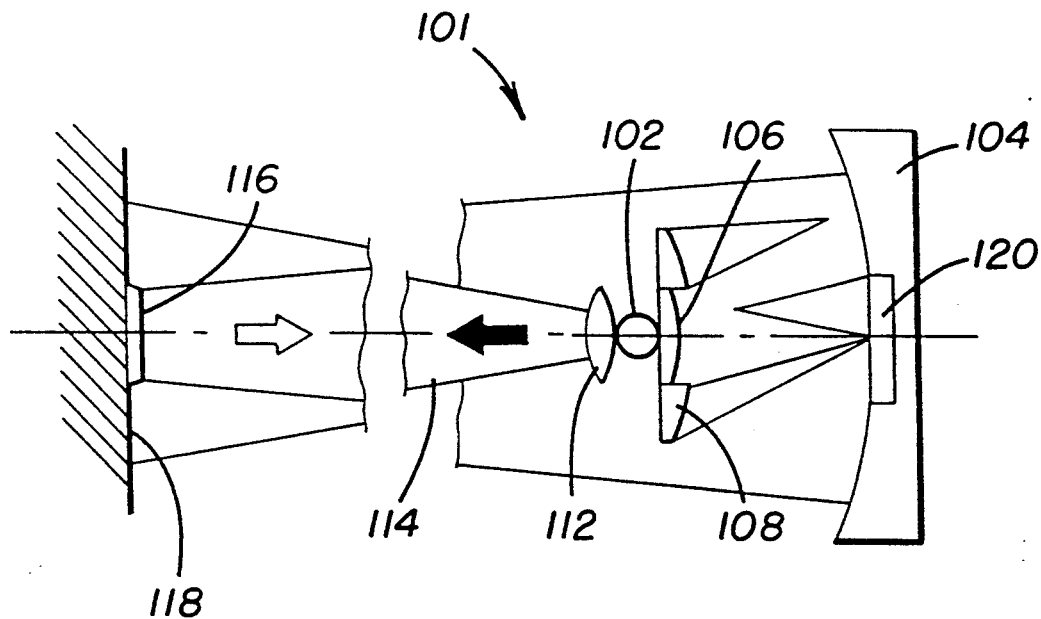
FIG. 9 is a representation of a commercial embodiment device for use in positioning machine tools adjacent a workpiece.

Referring now to FIG. 9, a particular embodiment of the laser compensating sensing and imaging device is shown in relation to a tool or the like that may be used in an industrial environment. In the view shown in FIG. 10, this particular tool is a welder or the like which is depicted schematically as welder 100. Referring now to FIG. 9, the laser portion of the device is shown schematically. A light source in the form of a laser is indicated at 102. As indicated in the principal embodiment, a cassegrainian system consisting of a primary mirror 104 and a secondary mirror 10 is shown. Surrounding the secondary mirror 106 is a tilt measuring lens 108. Again, it is pointed out that tilt measuring lens 108 is annular in nature and surrounds the secondary convex mirror 106. Here again, the structure would be contained in a tube 125 or the like as shown in FIG. 10a. Finally, an imaging lens 112 is positioned adjacent to the light source 102 so that beam 114 may be formed to impinge upon a reflective surface 116 (see FIG. 10) on a workpiece 118. The beam 114 is reflected back toward the cassegrainian system just described, so that a folded image is formed on a camera or CCD 120 located in the center of primary mirror 104. In a similar manner, a reflected beam returning from reflective surface 116 is, at the same time, focused on the CCD or camera 120 by means of the tilt measuring lens 108.

Using the same principles set forth above for alignment and focusing of the cassegrainian system in the principal embodiment, five degrees of freedom can be determined by this system in exactly the same manner. By using a second cassegrainian system 101 (see FIG. 10) the sixth degree of freedom can be obtained so that the two cassegrainian systems used together and affixed to a tool 100 will permit the cassegrainian laser focus compensating, sensing and imaging devices to position a tool 100 at various positions (Pos. 1, Pos. 2, Pos. 3) with reference to a particular workpiece 118. Thus, a seam may be welded between workpieces using this system in a robotic sense.

While this system has been described in relation to three embodiments, it is to be limited only so far as the claims which are appended herewith.

I claim:

1. A device for use with a source of a variable intensity laser beam and a focusing lens, the device comprising:
    a convex lens;
    a convex mirror;
    a concave mirror;
    a mounting positioning said convex and concave mirror to form a cassegrainian system, said convex lens mounted in the same plane as said convex mirror and coaxial therewith, said focusing lens mounted distal of said concave mirror exterior said cassegrainian system such that a low intensity and parallel ray coherent laser beam emanating from said source is focused to the focal point on said concave mirror by using said focusing lens and said cassegrainian system and such that a high intensity coherent and parallel ray laser beam emanating from said source and passing through said focusing lens is focused at the same focal point on said concave mirror.

2. The device of claim 1 wherein the convex lens is rotatable about two axes, each of said axes orthogonal to the axis of the cassegrainian system and orthogonal one to the other.

3. The device of claim 1 further including a light sensing device positioned at the focal point on said concave mirror.

4. The device o claim 3 wherein said sensing device is a charged coupled device.

5. The device of claim 4 further including display means for visually displaying images detected by said charged coupled device.

6. The device of claim 5 wherein the convex lens is rotatable about two axes, each of said axes orthogonal to the axis of the cassegrainian system and orthogonal one to the other.

7. The device of claim 6 wherein the focusing lens is translatable on two axes each of said axes orthogonal to the axis of the cassegrainian system and orthogonal on to the other.

8. The device of claim 3 further including a second sensing device positioned on the concave mirror distal of the convex mirror; and
    a second convex lens mounted on the exterior of said cassegrainian system and on the axis thereof such that an image of an object is focused on the second sensing device.

9. An optical system for aligning coaxial electromagnetic beams of coherent light but of different frequencies that are passed through a focusing lens, the system comprising:
    a first concave primary mirror;
    a first convex secondary mirror;
    a convex tilt measuring lens and;

a light sensing device;

said sensing device mounted at the center of said first concave primary mirror;

said first concave primary mirror and said first convex secondary mirror mounted to form a cassegrainian system and positionable coaxially to the focused electromagnetic beam and within the converging rays;

said convex tilt measuring lens mounted coaxial to said cassegrainian system so that a high intensity electromagnetic beam of coherent light after passing through said focusing lens will have a focal point at the center of the first concave primary mirror on the sensing device; and a low intensity coaxial electromagnetic beam of coherent light passing through said focusing lens will after passing through the cassegrainian system have the same focal point as the high intensity light.

10. A system for focusing at least two converging laser beams at different frequencies at a single point, the system comprising:

a cassegrainian system having a primary concave mirror and secondary convex mirror, said concave mirror defining a central bore;

a dichroic concave mirror defining a central bore, said dichroic concave mirror reflective to higher frequency laser beams and transparent to lower frequency laser beams, said dichroic concave mirror mounted within the cassegrainian system;

sensor means mounted within the converging laser beam but exterior of said cassegrainian system and proximate said primary concave mirror, said sensor means responsive to light for transmitting an image of impinging light to a visual display system, lens means adjacent to the convex secondary mirror and distal of the primary concave mirror, said lens means for further focusing the converging laser beam on said sensor means; and shutter means for selectively and alternatively interrupting portions of said converging laser beams so that said converging laser beam is directed first to said cassegrainian system and second to said lens means.

11. A device for use in guiding a tool attached to the device along a workpiece having a reflective path thereon, the device comprising:

a first laser source;

lens means to focus coherent light from said first laser on said reflective path;

a concave primary mirror, a convex secondary mirror, said concave mirror and said convex mirror mounted to form a cassegrainian system;

an annular convex lens mounted coaxial to the cassegrainian system and about said secondary mirror;

a first CCD mounted in the center of said primary mirror;

wherein laser light reflected from said reflective path and passing through said annular convex mirror will focus on said CCD and laser light reflected from said reflective path and reflected by said primary mirror and said cassegrainian system will also focus on said CCD.

12. The device of claim 11 further comprising a second device attached to the tool comprising:

a second laser source;

second lens means to focus coherent light from said second laser on said reflective path;

a second concave primary mirror, a second convex secondary mirror, said second concave mirror and second convex mirror mounted to form a second cassegrainian system;

a second annular convex lens mounted coaxial to the second cassegrainian system and about said second secondary mirror; and a second CCD mounted in the center of said second primary mirror of the second cassegrainian system;

wherein laser light reflected from said reflective path emanating from said second laser source and passing through said second annular convex lens of said second cassegrainian system will focus on said CCD and laser light reflected from said reflective path and reflected by said second primary mirror in said second cassegrainian system will also focus on said CCD;

whereby signals received by said first CCD and said second CCD will fix the location of said tool relative to said reflective path.

* * * * *